United States Patent [19]

Martinez et al.

[11] Patent Number: 5,335,448
[45] Date of Patent: Aug. 9, 1994

[54] AGRICULTURAL SUPPORT STAKES

[75] Inventors: Rodolfo M. Martinez; Gabrial M. Martinez, both of Guadalajara Jalisco, Mexico

[73] Assignee: Mangueras Especializadas Agricolas, S.A. De C.V., Col. Valle Del Alamo, Mexico

[21] Appl. No.: 802,893

[22] Filed: Dec. 6, 1991

[51] Int. Cl.⁵ .............................................. A01G 17/06
[52] U.S. Cl. .......................................... 47/47; 135/118
[58] Field of Search ......................... 47/47; 135/118; 248/508

[56] References Cited

U.S. PATENT DOCUMENTS

| | | | |
|---|---|---|---|
| 272,157 | 2/1883 | Riley . | |
| 2,763,096 | 9/1956 | Roger | 47/47 |
| 3,105,327 | 10/1963 | Gasper | 47/47 |
| 3,212,953 | 10/1965 | Grunder | 47/47 |
| 3,740,024 | 6/1973 | Hellerich et al. . | |
| 3,825,036 | 7/1974 | Stent . | |
| 3,875,699 | 4/1975 | Lamarre . | |
| 3,957,250 | 5/1976 | Murphy . | |
| 4,026,068 | 5/1977 | Tepper | 47/47 |
| 4,213,272 | 7/1980 | Nievelt | 47/47 |
| 4,330,491 | 5/1982 | Doshi et al. . | |
| 4,410,012 | 10/1983 | Redding et al. . | |
| 4,522,716 | 6/1985 | LaValley . | |
| 4,795,558 | 1/1989 | LaValley . | |
| 4,841,670 | 6/1989 | Bitter | 47/47 |

FOREIGN PATENT DOCUMENTS

| | | | |
|---|---|---|---|
| 208707 | 2/1940 | Switzerland | 47/47 |
| 1404327 | 10/1972 | United Kingdom . | |

*Primary Examiner*—Ramon S. Britts
*Assistant Examiner*—Joanne C. Downs
*Attorney, Agent, or Firm*—Arnold, White & Durkee

[57] ABSTRACT

A method and device for supporting plants involving a stake which includes a hollow tube made of polyvinylchloride and metal supporting wires directed axially and distributed around the circumference of the wall of the tube. Preferably, the hollow tube is formed with individual conduits running in an axial direction along or within the tube wall, each of which contains one of the wires and an adhesive material to hold the wires in place.

10 Claims, 3 Drawing Sheets

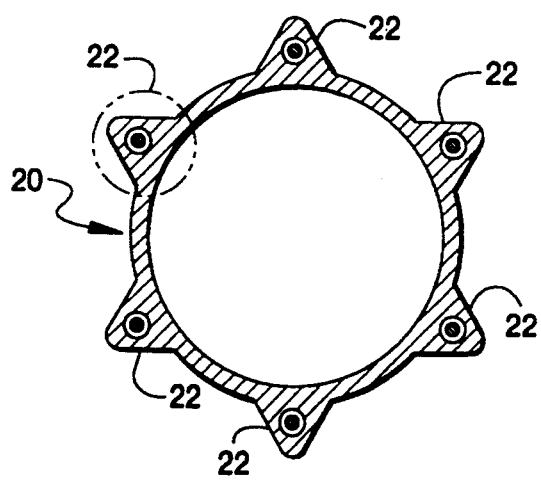
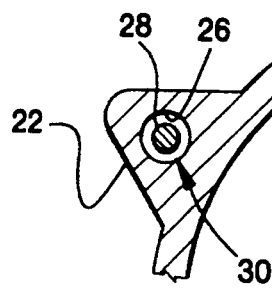
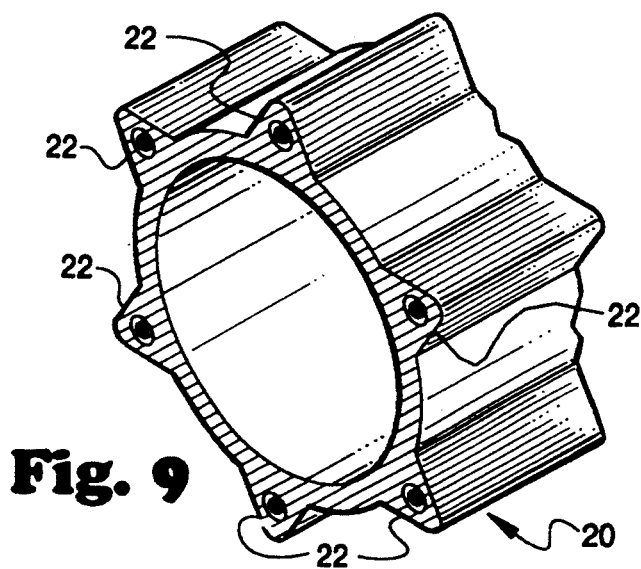
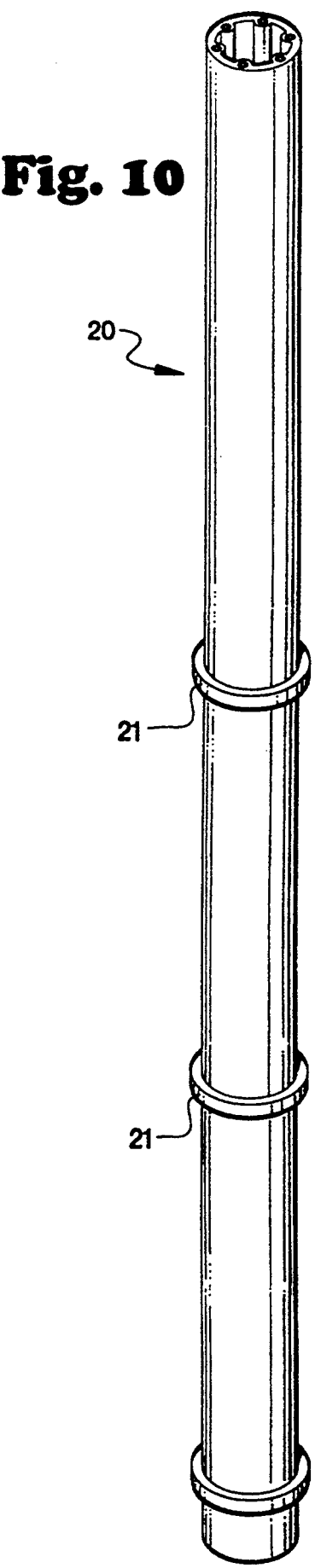

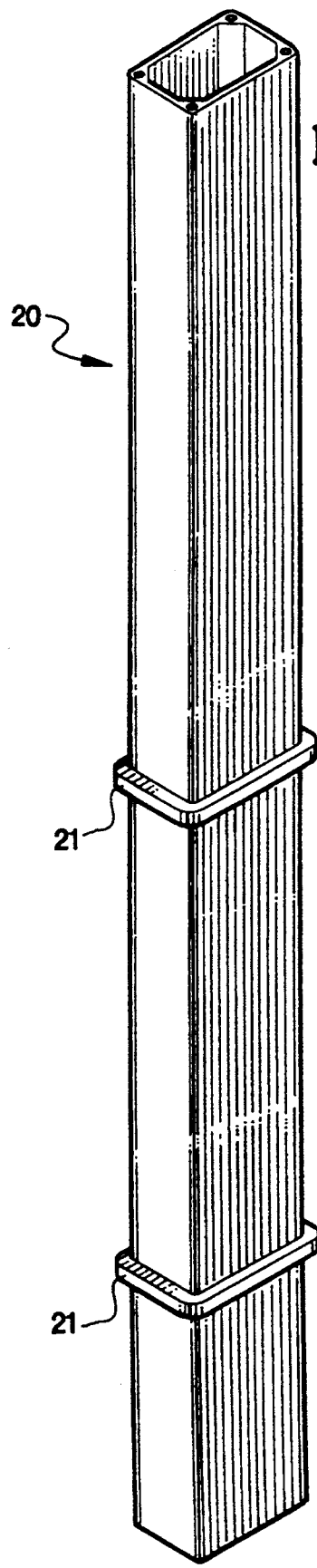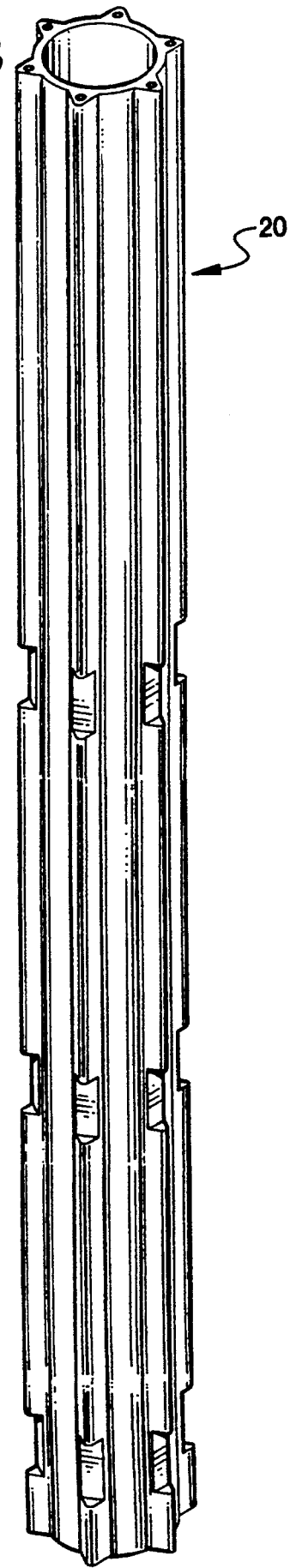

AGRICULTURAL SUPPORT STAKES

BACKGROUND

The invention is directed to a method for supporting plants and, more particularly, to agricultural support stakes having a unique construction as described herein.

Support stakes are used to support plants, bushes, shrubs, and vines. More specifically, for large scale operations in the agricultural industry, support stakes are used to support tomato and cucumber plants. Because the fields in which these plants are grown are replowed each year, there is a need for lightweight, temporary, support stakes which can be removed each year after harvest and replaced wherever new plants are grown.

In the past, support stakes have generally been made of various materials, including wood, metal, plastic and even concrete. These support stakes have a number of disadvantages. Wooden stakes are derived from a limited natural resource, namely trees, and have a limited life expectancy. Support stakes made of metal tend to oxidize. Plastic support stakes are not always strong enough to bear the weight of large plants. A continuing need therefore exists for strong, inexpensive, removable, lightweight support stakes.

SUMMARY OF THE INVENTION

The present invention is directed to a method and device for supporting plants involving use of a support stake having a unique construction. In particular, the device of this invention comprises a hollow tube having lightweight supporting members, preferably metal wires, which are directed axially along the tube and which are distributed around the circumference of the wall of the tube. In a preferred embodiment, the hollow tube is made of a durable, extrudable plastic such as polyvinylchloride (PVC), has a circular cross-section, and is formed with individual conduits. These conduits, distributed around the tube circumference, are integrated into the wall of the hollow tube and run in an axial direction along or within the tube wall. Preferably, each of these conduits contains a metal wire and an adhesive material which attaches the wire to the inner wall of the conduit. These wires, when distributed radially around the circumference of the hollow tube, provide lateral strength for the stake when used to support the plants. The method of this invention comprises inserting the stake in the ground to support one or more individual plants, either directly or indirectly by strings running between the stakes and plants.

BRIEF DESCRIPTION OF THE DRAWINGS

FIG. 7 is a cross-sectional view of a support stake which has a circular cross section and conduits outside the tube wall.

FIG. 8 is a cross-sectional view of one of the conduits 22 in FIG. 7.

FIG. 9 is a partial perspective view of the support stake shown in FIG. 7.

FIG. 10 is a full perspective view of the support stake partially shown in FIGS. 1, 2, and 3.

FIG. 11 is a full perspective view of the support stake partially shown in FIGS. 4, 5 and 6.

FIG. 12 is a full perspective view of the support stake partially shown in FIGS. 7, 8, and 9.

DETAILED DESCRIPTION

This invention relates to a method and device for supporting plants involving use of a support stake having a unique construction. In a preferred embodiment, the hollow tube of the invention is made of a durable plastic and is formed with individual conduits distributed around the tube circumference which run in an axial direction along or within the tube wall. Preferably, each of these conduits is integrated into the wall of the hollow tube, and contains both a metal wire and an adhesive material.

Perspective views of specific embodiments of the invention are shown in FIGS. 10, 11 and 12, the primary difference among them being their cross-sectional shapes and the positions of the conduits and wires. Preferably, the hollow tube of the invention has a circular cross-section, as shown in FIGS. 1, 2, 3 and 10. However, the hollow tube may also be oval, square, rectangular or even polygonal in cross-section. A hollow tube with a rectangular cross-section is shown in FIGS. 4, 5, 6 and 11 where like parts are referenced with the same numbers as in the other figures.

The hollow tube 20 should be made of an extrudable material, preferably, polyvinylchloride (PVC). While other types of plastic materials, such as polyethylene or polypropylene, may also be used, it has been discovered that epoxy adheres better to PVC than to other plastics. Thus, PVC is preferred when epoxy adhesive is used to attach the wires to the hollow tube.

Figure 1:
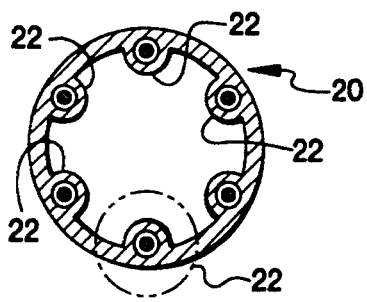
FIG. 1 is a cross-sectional view of a support stake with a circular cross section.
Figure 2:
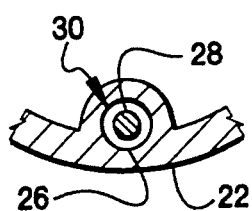
FIG. 2 is a cross-sectional view of one of the conduits 22 in FIG. 1.
Figure 3:
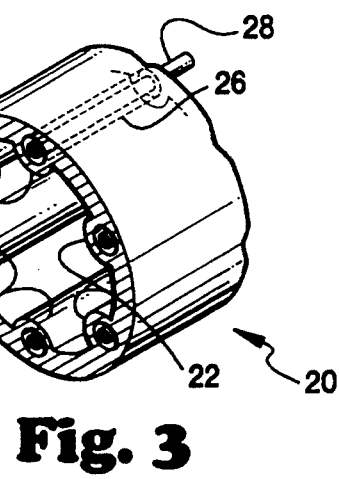
FIG. 3 is a partial perspective view of the support stake shown in FIG. 1.
Figure 4:
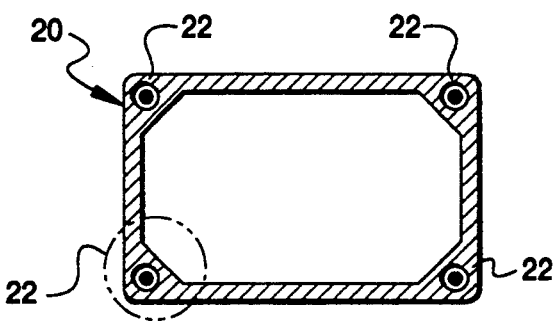
FIG. 4 is a cross-sectional view of a support stake with a rectangular cross section.
Figure 5:
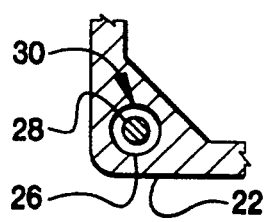
FIG. 5 is a cross-sectional view of one of the conduits 22 in FIG. 4.
Figure 6:
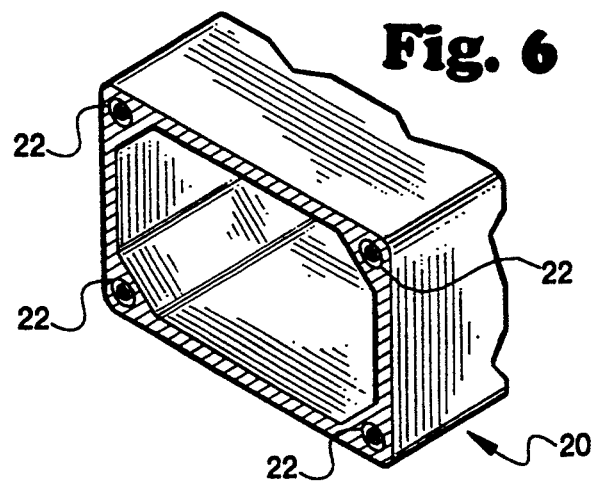
FIG. 6 is a partial perspective view of the rectangular support stake shown in FIG. 4.

The hollow tube 20 may be formed with individual conduits 22 built into the wall of tube 20 running in an axial direction. As evidenced by the various embodiments of the invention, the conduits 22 may be positioned on the inner portion of the wall (FIG. 1) in the middle of the wall (FIG. 4) or on the outer portion of the wall (FIG. 7). Generally, the term "conduit" describes the portion of the hollow tube that defines the hole through which the wire and adhesive material pass. Cross sectional views of conduits 22 in the various circular and rectangular tube embodiments are shown in FIGS. 2, 5 and 8. Each conduit 22 has an inner wall 26 and provides a hole, preferably one which extends axially along the tube, more preferably for the entire length of the tube. The inner wall 26 of conduit 22 is shown in FIG. 3 by the broken lines. The wire running through the conduit is not shown. For simplicity, these broken lines have not been included in the other conduits in FIG. 3 or in any of the other figures.

In various specific embodiments of the invention, each hollow tube 20 includes wires 28 as shown in FIGS. 2, 5, and 8. These wires 28 are disposed axially along the length of the hollow tube 20 through conduits 22. The wire 28 is preferably made of metal. Metal wire is available in commercial quantities and has desirable properties, such as strength, flexibility, durability and longevity. An important characteristic of the metal wires is flexibility, which is provided by small-gauge wire preferably one having a diameter of not more than about 0.083 inches. Such metal wire is easily attached to or embedded within the wall of the hollow tube 20 in accordance with the invention by inserting it within the individual conduits 22 after the tube 20 has been extruded.

In a specific embodiment of the invention, the hollow tube includes an adhesive material 30 which secures the wires 28 to the inner walls 26 of the conduits 22 and keeps the wires in place. This adhesive is a significant component of this particular embodiment of the invention. Without adhesive to secure the wire to the inner wall of each conduit, the wire tends to slide in relation to the hollow tube when a bending moment is applied to the stake. The adhesive material is preferably epoxy. The epoxy resin presently preferred is called Araldite-D resin, made by Ciba Geigy, and is mixed with a hardener called HY-956 during application.

Generally, the plastic material should be capable of being formed into the hollow tubes described herein by a conventional extrusion process. A presently preferred method of making the support stakes of this invention involves extruding PVC to form a hollow tube 20 having the desired configuration including the individual conduits 22. The PVC may be extruded in a CM-65 twin conical screw extruder manufactured by Cincinnati Milacron using barrel temperatures between about 370° F. and 390° F. and die temperatures of about 360° F.

After the extruded hollow tube is cooled, a wire 28 and optionally an adhesive material 30 are introduced into one or more of the conduits 22. Preferably, at least a portion of the adhesive material 30 contacts both the outer surface of the wire 28 and the inner wall 26 of the conduit 22 so that when dry the adhesive material 30 helps secure the wire 28 to the wall 26 of the conduit 22 and further strengthen the hollow tube 20. The diameter of the conduit or hole 22 should be sufficiently large to permit the wire 28 to be inserted along the length of the conduit, yet not so large that the adhesive cannot fill in the annular space between the wire and the inner surface of the conduit 22.

It is contemplated that the wire and hollow tube may also be extruded together in a single step, which would obviate the need to apply adhesive before inserting the wire. However, such method is not presently considered practical because the PVC and metal wire behave differently under heat. Accordingly, in a preferred method, the hollow tube 20 is extruded and cooled after which adhesive material 30 and wire 18 are introduced to the individual conduits 12 in separate steps. For example, the adhesive material 30 may be injected with a large syringe in one end of each conduit 22 in an amount sufficient to fill up approximately half the length of conduit 22, after which the end is plugged. Then, before the adhesive material has dried, a wire 18 is inserted into each conduit 22 from the opposite end so that the adhesive substantially fills up the entire annular space between the wire 28 and the conduit wall 26. When the adhesive dries, the wire 28 is securely contained within the wall of the hollow tube 20, thus providing support to the tube 20.

A particularly advantageous aspect of the invention is the combination of a hollow tube together with the adhesive and wires. The wires support a significant amount of the stress that is typically applied in the field by the plants. However, it is contemplated that such support is not available unless the wire is in some manner attached to the hollow tube so that the wire is able to lend its reinforcing properties to the tube when a bending moment is applied. Thus an attachment means, such as that provided by the adhesive, should be included. A support stake built in accordance with the invention was tested by placing it between two supports and hanging a weight to the middle. It was discovered that sufficient weight could be applied to produce a bending moment greater than the moment to which it would be subjected to in the field, without breakage.

Another advantageous aspect of the invention is the hollow construction of the tube, which reduces the amount of plastic material needed to construct the stake and thus reduces cost. The hollow tube may be left open at both ends as shown in FIGS. 10, 11, and 12 so that it may be easily pushed into the ground without the need for a closed or sharpened end. Alternatively, the end which is to be inserted into the ground may be crimped or flattened so that the stake may be more easily pushed into the ground.

Support stakes of this invention are useful in large scale tomato or cucumber growing. The stakes, which are about six feet long, may be inserted into the ground about six feet apart, along a straight line some 300 feet long. In the space between the stakes, 3 or 4 plants are placed in the ground. As the plants grow, they are supported by strings that go from stake to stake along the 300 foot line. As the plants grow taller, other strings are put at higher positions in the stakes to support the plants.

The rings 21, shown in FIGS. 10 and 11, are held in place by adhesive and are used to prevent the strings from slipping down the stake. The rings, which may number five or six per stake, are placed at appropriate heights according to the needs of the tomato and cucumber growers. In another embodiment of the invention such as the one shown in FIG. 12, the hollow tube includes indentations whose purpose, like the rings, is to prevent the strings from slipping down.

Additional advantages and modifications will be readily apparent to those skilled in the art. For example, the wires which are radially disposed along the length of the tube may be adhered to the inside or outside surfaces of the hollow tube without a conduit. Also, modifications relating to the ends of the hollow tubes may be accomplished while still staying within the scope of the invention. One end of the tube could be cut at a slant to provide a pointed end so that the tube could be more easily pushed into the ground. Also, one or both ends could be closed with one of the ends being sharp or pointed and the other end being flat or having an enlarged surface so that the stake could be hammered into the ground. The invention in its broader aspects is therefore not limited to the specific details or the representative devices, methods, and illustrations shown and described. Departures may be made from the specific details without departing from the spirit or scope of the disclosed general inventive concept.

What is claimed is:

1. An agricultural support stake for supporting a plant, comprising an extruded plastic hollow tube, said hollow tube having an inner wall surface and an outer wall surface, a plurality of conduits being disposed between said inner wall surface and said outer wall surface of said hollow tube and distributed radially around the circumference of said hollow tube, each of said conduits having an inner wall, each of said conduits extending axially along said hollow tube, said agricultural support stake further comprising a plurality of flexible metal wires disposed within said plurality of conduits, each of said flexible metal wires being spaced from said inner wall a sufficient distance to provide a space between said flexible metal wires and said inner wall of said conduits to receive an adhesive material after the insertion of said flexible metal wires.

2. The agricultural support stake of claim 1 additionally comprising an adhesive disposed between at least a portion of said flexible metal wires and said inner wall of at least one of said conduits.

3. The support stake of claim 1 additionally comprising an adhesive material in said space between the flexible metal wires and said inner wall of said conduits, said adhesive material securing said flexible metal wires to said inner wall of said conduits.

4. The support stake of claim 3 in which said adhesive adhesive material comprises an epoxy resin.

5. The support stake of claim 1 in which the outer wall surface of said hollow tube has a plurality of indentations for receiving string or wire for supporting said plant.

6. The support stake of claim 1 in which said hollow tube additionally comprises at least one ring circumscribing said hollow tube for supporting string or wire to support said plant.

7. A method of supporting a plant, comprising:
providing an agricultural support stake that comprises an extruded plastic hollow tube which includes a plurality of conduits and a plurality of flexible metal wires disposed axially in relation to said hollow tube within said plurality of conduits and distributed radially around the circumference of said hollow tube, each of said flexible metal wires being spaced from said inner wall a sufficient distance to provide a space between said flexible metal wires and said inner wall of said conduits to receive an adhesive material after the insertion of said flexible metal wires;
inserting said agricultural support stake into the ground; and supporting said plant with said agricultural support stake.

8. The method of claim 7 additionally comprising the step of providing a plurality of said agricultural support stakes and at least one string or wire disposed between said agricultural support stakes for supporting said plants.

9. A method of supporting a plant, comprising:
providing an agricultural support stake that comprises an extruded plastic hollow tube and a plurality of flexible wires disposed axially along the length of said hollow tube and distributed radially around the circumference of said hollow tube; and
inserting said agricultural support stake into the ground to support said plant with said agricultural support stake; wherein
said hollow tube has an inner wall surface and an outer wall surface, a plurality of conduits being disposed between said inner wall surface and said outer wall surface of said hollow tube, said plurality of conduits being distributed radially around the circumference of said hollow tube, each of said conduits having an inner wall, each of said conduits extending axially along said hollow tube, each of said conduits having a diameter sufficient to receive by insertion one of said plurality of metal wires, each of said flexible metal wires being spaced from said inner wall a sufficient distance to provide a space between said flexible metal wires and said inner wall of said conduits to receive an adhesive material after the insertion of said flexible metal wires.

10. An agricultural support stake for supporting a plant, comprising an extruded plastic hollow tube, said hollow tube having an inner wall surface and an outer wall surface, a plurality of conduits being disposed between said inner wall surface and said outer wall surface of said hollow tube and distributed radially around the circumference of said hollow tube, each of said conduits having an inner wall, each of said conduits extending axially along said hollow tube, said agricultural support stake further comprising a plurality of flexible metal wires disposed within said plurality of conduits, each of said flexible metal wires being spaced from said inner wall a sufficient distance to provide a space between said flexible metal wires and said inner wall of said conduits to receive an adhesive material, said agricultural support stake further comprising an adhesive material in said space for securing said flexible metal wires to said inner wall of said conduits.

* * * * *